United States Patent [19]

Baker et al.

[11] Patent Number: 4,735,089

[45] Date of Patent: Apr. 5, 1988

[54] SHAKER TABLE

[75] Inventors: Richard L. Baker, San Clemente; Robert H. Weinmann, Jr., Laguna Hills, both of Calif.

[73] Assignee: Hughes Aircraft Company, Los Angeles, Calif.

[21] Appl. No.: 813,811

[22] Filed: Dec. 27, 1985

[51] Int. Cl.⁴ ............................................. G01N 29/04
[52] U.S. Cl. ........................................ 73/663; 73/665; 73/666
[58] Field of Search .................. 73/662, 663, 665, 666

[56] References Cited

U.S. PATENT DOCUMENTS

| 2,706,400 | 4/1955 | Unholtz | 73/666 |
| 3,369,393 | 2/1968 | Farmer | 73/663 |
| 3,686,927 | 8/1972 | Schartar . | |
| 3,945,246 | 3/1976 | Wadensten | 73/666 |
| 4,181,029 | 1/1980 | Talbott, Jr. | 73/665 |
| 4,440,026 | 4/1984 | Kimball | 73/663 |

FOREIGN PATENT DOCUMENTS

| 171624 | 11/1965 | U.S.S.R. | 73/663 |
| 838485 | 6/1981 | U.S.S.R. | 73/663 |

*Primary Examiner*—Howard A. Birmiel
*Attorney, Agent, or Firm*—L. B. Sternfels; A. W. Karambelas

[57] ABSTRACT

A shaker table (10) includes a table base (12) mounted upon isolating supports (32) and vibrated by vibrators (34, 36). The vibration is conveyed through and damped in a flexure member (16) comprising pairs (26, 28) of honeycomb layers (18, 20, 22, 24) joined and bonded together by sheets (42) utilizing beads of elastomeric adhesive which space the honeycomb layers apart. A segmented top plate (14) is secured to the topmost honeycomb layer and is divided into a plurality of sections or segments (68-82) for separate resonances. In this way, highly damped vibrational resonances of table top plate (14) are obtained.

29 Claims, 3 Drawing Sheets

SHAKER TABLE

BACKGROUND OF THE INVENTION

1. Field of the Invention

This invention is directed to a shaker table which permits a device to be screened under any desired vibrational conditions and, in particular, under laboratory or assembly line conditions.

2. Description of the Prior Art and Other Considerations

Such shaker tables, permitting a device or product to be shaken in the laboratory or in an assembly line, enables any defects, which may be a result of the manufacturing process, to be found. In this way, devices or products, which have defects caused by variations in fabrication processes or workmanship, may be screened out of the production line before being shipped to a customer.

In order to achieve the desired vibrational screening modes, various shaker table designs have been employed. Examples include those described in U.S. Pat. Nos. 4,181,025 through 4,181,029 and the references cited or discussed therein. An exemplary shaker table comprises a platform, to which the device to be screened is secured, and vibration drivers for the platform. One problem with a simple shaker table is that damping is low so that, when a resonance point is reached within the frequency range of the screen, the amplitude rises to a sharp and potentially destructive peak. The result is that the device is screened at a high amplitude over the narrow range of resonance and a much lower amplitude over the remainder of the frequency band. Unless the resonance points of the screen excite the resonances of the device without over-stress, the vibration screen will damage the device or will, by necessity, be run at such a low overall acceleration level as to be ineffective. It has become increasingly evident throughout the industry that multi-axial (three to six simultaneous degrees-of-freedom) random vibration screening is more efficient both in the time it takes to complete a screen and in the number and type of defects detected by the screen. Because all vibrational axes of interest may be screened simultaneously, a multi-axis screen sequence usually takes one-third the time of that required by a single axis system. In addition, the multi-axial excitation of the device tends to cause a higher number of intermittent defects to be detected because of the increased number of acceleration vectors experienced by the device's components. Thus, there is need for a vibration table which translates multiple vibration pulses into a quasi-random, multi-degree-of-freedom, acceleration spectrum which does not have significant individual resonance peaks, but is highly damped and has a plurality of highly damped resonance points so that the table amplitude is substantially constant over the frequency range of the shaker table.

SUMMARY OF THE INVENTION

Accordingly, the present invention is directed to a shaker table which translates multiple vectored vibrator pulses into a quasi-random, multi-degree-of-freedom, acceleration spectrum. As used herein, the terms "quasi-random," "multi-degree-of-freedom," and other terms relating to any operational characteristics and functions, such as "pseudo-random," "spectrum," and "multi-modal," whenever used, have the same meanings as defined in the above-mentioned U.S. Pat. Nos. 4,181,025 through 4,181,029. The table has a plurality of damping layers between one or more shaker vibrators and the table platform of any desired geometric configuration so that resonance peaks are damped out and several resonances are produced.

In a preferred embodiment, the present invention comprises a top segmented plate, a bottom single plate, and a flexure member bonded therebetween. The flexure member is configured to provide two degrees of flexure and preferably includes at least one pair of honeycomb structures, whose honeycomb openings extend perpendicular to both plates. Because honeycomb structures, at least of the metallic type, are formed from a plurality of undulated sheets which are bonded together along their lengths, they have a greater flexibility in the direction normal to the direction, rather than in the same direction, in which the sheets extend. By placing the two honeycomb structures together, so that the individual sheets are directed 90° with respect to one another, it is possible to develop flexure and desired amplification in the x-y directions.

The top segmented plate preferably has an even number of segments positioned about a central segment. Opposite segments, generally 180° from each other about the central segment, have generally the same shape. However, there need not be an even number of segments, nor is it required that any be shaped similarly as another. Spaces between the segments as well as the entire table top are filled and covered with a synthetic rubber or other elastomeric substance to provide damping.

An item to be screened is attached to the various segments in the top segmented plate. Vibrators are secured to the bottom single plate. Holes extend through the top segmented plate and the honeycomb structures to the vibrators. These holes pass through the spaces or channels between the segments to enable vibrational interaction from a single vibrator with at least two segments.

The segmentation of the top plate and its bonding to the flexure member (the honeycomb structures) enhances higher accelerations. The bottom plate is responsible for enhancing the lower frequency accelerations. The segments in the top plate can move with respect to one another and to the remainder of the plate. Vibrational tuning is achieved by geometrical changes in the material of the segments and the bottom plate.

The shaker, when included in a vibration system, enables the attached mechanical or electro-mechanical item to be vibration screened under controlled conditions of multi-frequency, multi-degree-of-freedom acceleration. The resulting acceleration frequency spectrum and acceleration-level control of the broadband quasi-random vibration output in the frequency range, for example, from 40 Hz to 2000 Hz is well suited for the screening process in that it excites the nondestructive resonances within the product-underscreen, thus precipitating and thus detecting most defects within the product. The damped resonating interface table which connects the multiple pneumatic driven vibrators to the product-under-screen is the device which translates the vibrators' impact line spectra into a quasi-random, plurality of highly damped resonance points such that the adjustable six-degree-of-freedom table amplitudes are substantially constant over their frequency range. The selection of table materials for their multi-axis compliance, multi-mode vibration of nonhomogeneous - nonsymmetrical structures and fatigue life characteristics along with the complex layering with damping and bonding agents plus the locations for vibrator attachment and top surface segmentation produce a table assembly with adjustable overall RMS acceleration levels in each of the simultaneously excited six-degrees-of-freedom along with a multitude of overlapped damped resonances which eliminate the problems of significant individual resonance peaks inherent in more conventional vibration tables.

Other purposes and advantages of the present invention will become apparent from a study of the following portion of the specification, the claims and the attached drawings.

DESCRIPTION OF THE PREFERRED EMBODIMENT

Figure 1:
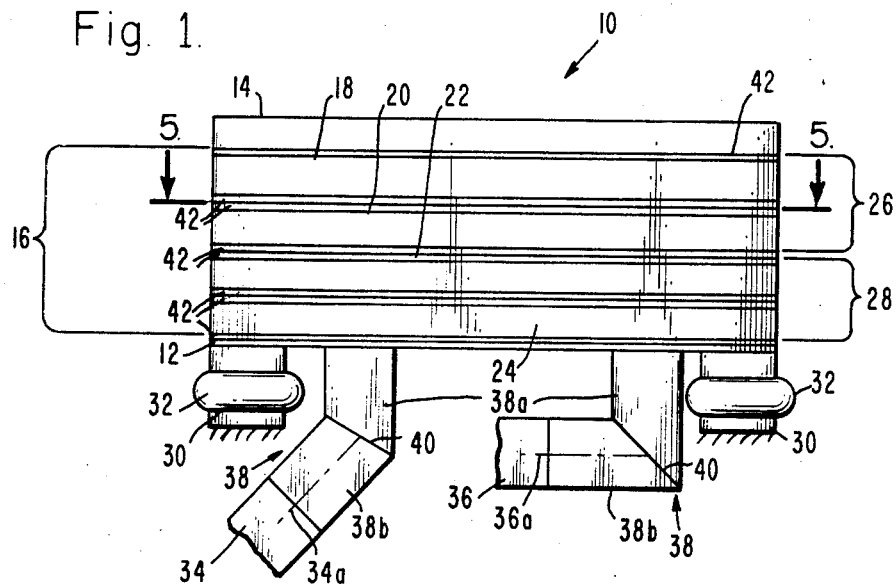
FIG. 1 is a side elevational view of a preferred embodiment of the shaker table of the present invention illustrating top and bottom plates sandwiched about a layered flexure member.

In the preferred embodiment of the present invention shown in FIG. 1, a shaker table 10 comprises a table bottom or bottom plate 12, a segmented table top or top plate 14 (see also FIG. 2), and a flexure member 16. The flexure member includes a plurality of layers 18, 20, 22 and 24 paired together as flexure member pairs 26 and 28. As seen in side elevation in FIG. 1, bottom plate 12 forms a table base which may conform to the table's overall lateral dimensions. As an example, a specific table base has a rectangular configuration with overall dimensions of 20×24 inches (50.8×61 cm) and comprises a flat steel plate of ≐ inch (0.64 cm) thickness. The table base is mounted on a foundation 30 by a plurality of supports, such as pneumatic supports 32, which isolate the motion of table base 12 from the foundation. At least three such pneumatic supports are required and, because the illustrative table base is rectangularly shaped, four such pneumatic supports are used.

A plurality of vibrator assemblies, of which only two, 34 and 36, are shown and which comprise vibration drivers, are mounted at selected locations and at adjustable angles to the underside of base 12 through the intermediary of surface swivels 38 comprising relatively movable halves 38a and 38b. Each vibrator assembly is secured to its half 38b by any appropriate means. The adjustability is obtained by angled interfacing surfaces 40 respectively between respective surface swivel halves 38a and 38b. By pivoting one half to the other, vibrational forces can be applied along any selected axis. As illustrated in FIG. 1, the axes of vibrator drivers 34 and 36 are designed respectively by indicia 34a and 36a. In addition, surface swivels 38 are joined to bottom plate 12, which junction enables the angled assembly of the vibrator drivers and the surface swivels to be rotated 360° with respect to the bottom plate, to flexure member 16 and to the several points at the intersections between the segments of segmented top plate 14, as will be explained further with respect to FIG. 2.

Energization of drivers 34 and 36 vibrates table base 12. The mounting positions and mounting angles of the vibrator drivers are selected to excite a plurality of different resonances and resulting force vectors.

When such resonances are undamped, the amplitude becomes quite high, but over a narrow frequency span. The amplitude versus frequency curve of an undamped system of such nature would have quite high spikes. Because there are several vibrator assemblies attached to the table base at different locations, each would resonate at a different frequency. Thus, in a system with little damping, there would be a plurality of spaced amplitude spikes. In the preferred embodiment of shaker table 10, a plurality of vibrator assemblies 34 and 36 is secured to table base 12 in such a manner as to create resonances spaced along the frequency range of interest. This is accomplished by locating the exciting vibrator assemblies at the proper positions on the table base and by positioning each of them at the correct excitation angle. Such locating and positioning, to obtain the desired resonances and spacings, is accomplished empirically. The amplitude at resonance of such vibration is much higher than the amplitude at non-resonance, for effective amplification of the amplitude.

Flexure member 16 and its plurality of layers 18-24 damp the vibration to reduce the amplitude peaks and to spread the amplification due to resonance over a more broad frequency spectrum. The breadth of spreading of the resonance peaks is preferably sufficient to enable the adjacent resonances to overlap and to provide a substantially uniform amplitude over the entire frequency band. Damping is provided preferably by forming layers 18-24 as a sandwich of honeycomb structures (see also FIGS. 3 and 4). Each honeycomb structure comprises a center portion or core 41 formed from corrugated sheets 48 and 50, which comprise foil, e.g., of aluminum, and which are bonded together at their contacting surfaces 52 and 54. The top and bottom of core 41, where its honeycomb cells open, are covered by and bonded to a pair of sheets 42, such as by gluing, welding or brazing. Thus, sheets 42 and center portion 41 form a unitary sandwich, which is the honeycomb structure. It is preferred that the honeycomb layer be quite thick and have fairly heavy sheets 42, for example, of aluminum with a 0.020 inch (0.05 cm) thickness.

The layers or sandwiches of honeycomb structures are secured to one another by bonding their resective facing sheets 42 by a series of beads 44, as described immediately below with repsect to FIG. 5. Lowermost honeycomb layer 24 is bonded throughout its lower or bottom sheet 42 to table base 12.

Figure 5:
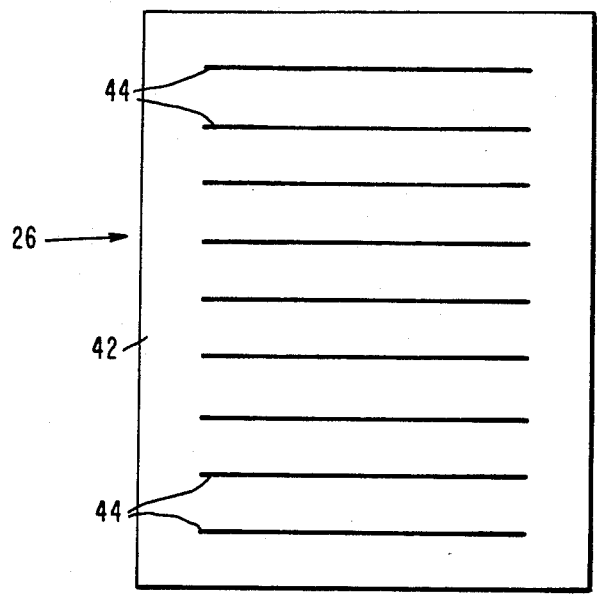
FIG. 5 is a downward looking section of a junction between flexure member layers, taken generally along the line 5—5 of FIG. 1.

Specifically, the upper side of honeycomb layer 24 and all other interfacing sides between layers 18, 20 and 22 and their sheets 42 are selectively bonded together, as exemplified in FIG. 5 by the series of beads. Beads 44 comprise an adhesive and are laid on the cover sheet of the honeycomb layer in straight parallel lines spaced from each other. The downward looking view in FIG. 5 shows one sheet and, thus, the adhesive joint between honeycomb layers 18 and 20. The adhesive joint between layers 20 and 22 is the same, except that its lines lie at right angles to beads 44. The joint between layers 22 and 24 is the same as that shown in FIG. 5, so that the direction of the beads alternates between joints. Adhesive beads 44 are formed of a silicone rubber of considerable viscosity so that they will not run together. The adhesive joint between table base 12 and layer 24 is an overall adhesive attachment of elastomeric material, such as silicone rubber, but of a higher initial viscosity.

Figure 2A:
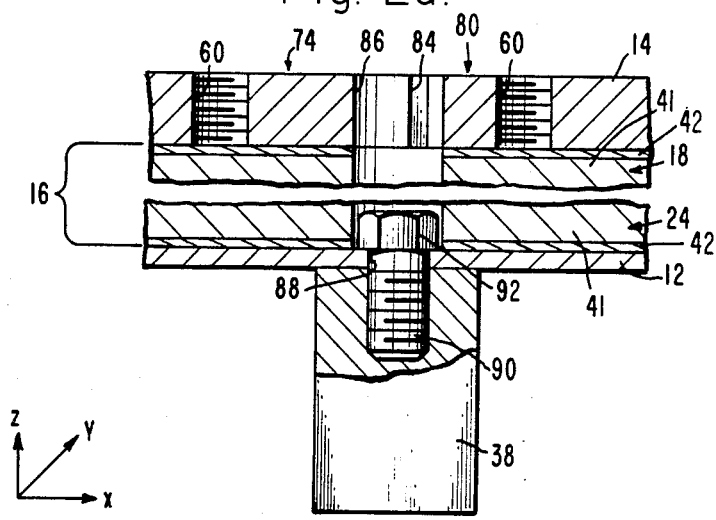
FIG. 2a is a section taken along the line 2a—2a of FIG. 2.
Figure 2:
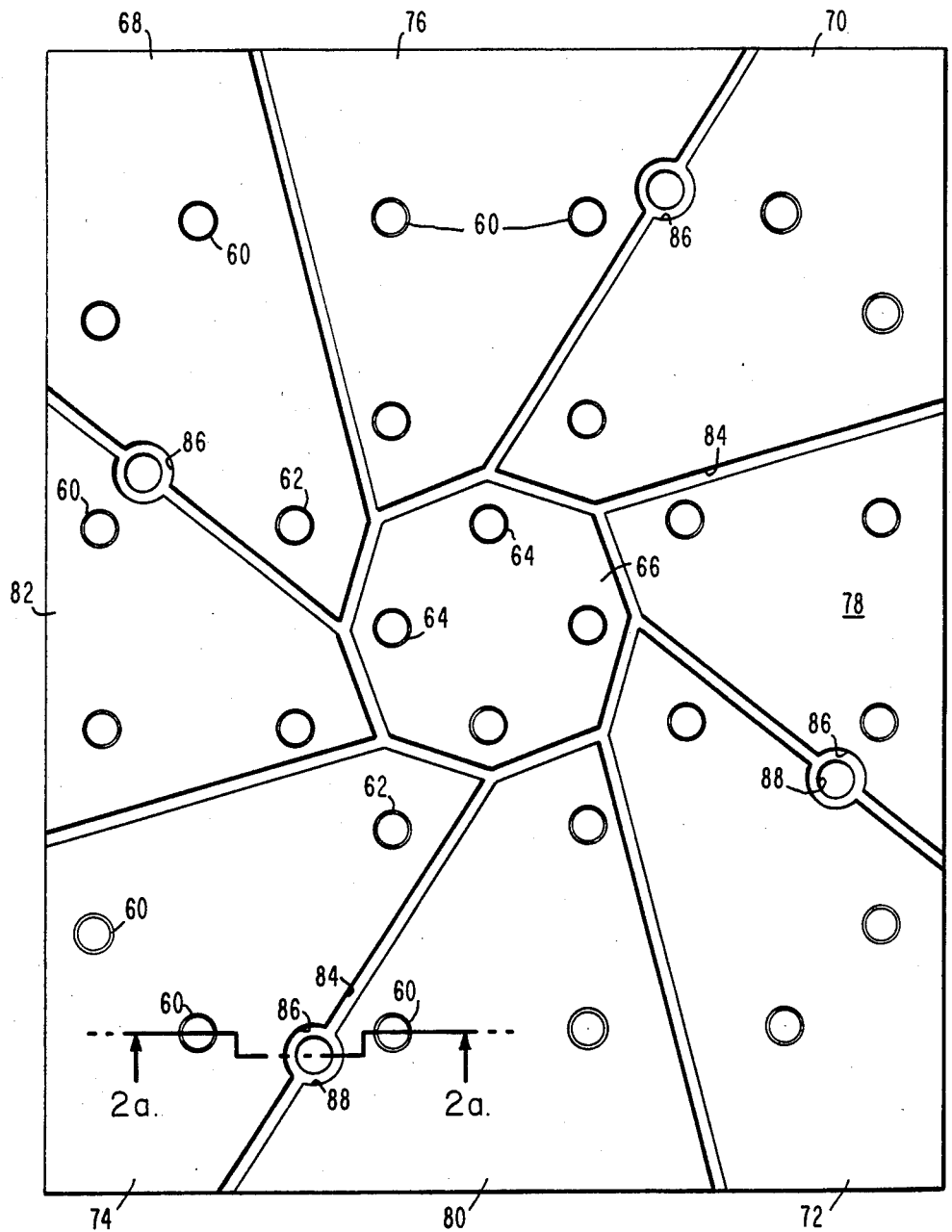
FIG. 2 is a partial top view of the table platform's top plate.
Figure 3:
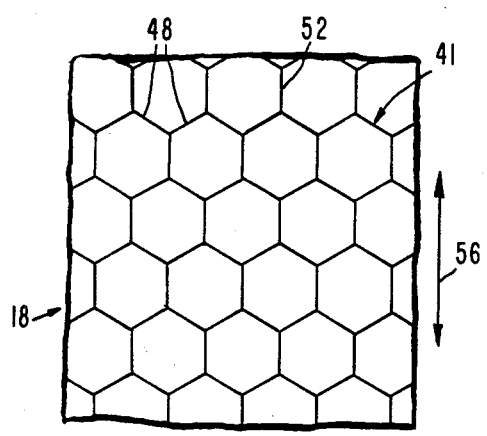
FIG. 3 and 4 are internal views of adjacent layers in the flexure member.
Figure 4:
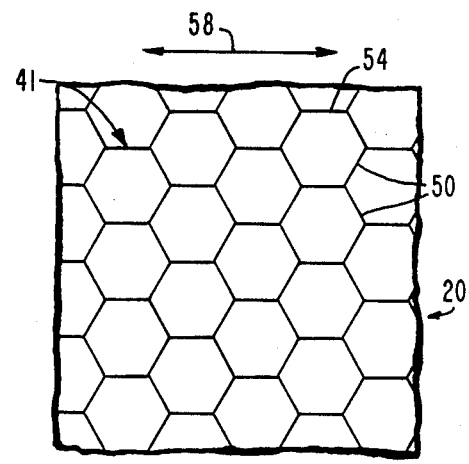

The resilient elastomeric adhesive also allows increased motion, i.e., compliance, in the X and Y directions which are shown both in the coordinates of FIG. 2a and by double-headed arrows 56 and 58 of FIGS. 3 and 4. The X and Y directions define a plane in which X and Y acceleration vectors reside. The increased motion or compliance amplifies the X and Y acceleration vectors with respect to the Z vector (lying in a plane orthogonal to the X-Y plane) and aids in XYZ balance adjustments effected by mutual rotation between surface swivel halves 38a and 38b.

As shown in FIGS. 3 and 4, a honeycomb layer, such as any of honeycomb layers 18–24 and specifically identified respectively as layers 18 and 20, as stated above, comprise corrugated sheets 48 and 50 of foil which are doubled and attached together at contacting surfaces 52 and 54. The direction in which sheets 48 and 50 extend is stiffer than in the direction perpendicular thereto. Thus, in FIG. 3, sheets 48 of honeycomb layer 18 extend in a direction indicated by double-headed arrow 56 so that layer 18 is stiffer in direction 56 than in a direction angled thereto. Likewise, honeycomb layer 20 is stiffer in the direction of double-headed arrow 58, which is the direction of sheets 50, than in any direction angled thereto. Adjacent honeycomb layers, e.g., adjacent layers 18 and 20, are alternated in the stack so that directions 56 and 58 are at right angles to one another, and the same right angle alterations are continued for layers 22 and 24. Therefore, the sheets of honeycomb layers 18 and 22 lay in parallel directions, and those directions are perpendicular to the directions of the sheets in honeycomb layers 20 and 24. In this way, the stiffness through the stack of honeycomb layers is varied and equalizes acceleration vectors in the X and Y directions and damping in all table directions.

Table top or top plate 14 is the plate upon and to which the device or item to be screened is placed and secured. The table top preferably comprises a lightweight material and a construction to minimize its mass; yet it is sufficiently thick so that bolt holes can be formed therein to enable attachment of the screen item thereto. Therefore, top plate 14 is preferably of aluminum which is configured as a sheet or plate from ½ inch (1.27 cm) to 1 inch (2.54 cm) thick. A section of the top plate is seen in plan view in FIG. 2 and in sectional view in FIG. 2a and illustratively has an outer, generally square pattern of bolt holes 60 (e.g., sixteen in number), an inner, concentric generally square pattern of bolt holes 62 (e.g., eight in number) and yet another inner, concentric, generally square pattern of bolt holes 64 (e.g., four in number). The device to be screened is placed upon top plate 14 and secured thereto by clamps which are bolted into several of the bolt holes. The many bolt holes are provided so that the shaker table is universal to many different devices. If only one particular shape of device is to be shaken, fewer bolt holes would be necessary, but sufficient in number for the appropriate clamping of the device.

In order further to provide highly damped multiple resonances, the top plate is segmented into a plurality of sections, here shown to be nine. An irregular octagonal section or segment 66 is placed in the center of the top and is preferably positioned with its corners directed in the principal rectangular directions of rectangular plate top 14, but the octagonal center section of the top can be somewhat tilted. In a preferred embodiment, one of the principal sides is at a 20° angle with respect to the principal rectangular direction. The square pattern of four bolt holes 64 is entirely positioned within the octagonal center section 66. The remainder of the top plate is divided into eight sections or segments, each joining one of the sides of the octagonal center segment or section 66. Each of the sides of the rectangular top plate is trisected so there are four corner segments or sections 68, 70, 72 and 74. Each one of these corner segments adjoins one of the sides of the octagonal center. Four more side segments or sections 76, 78, 80 and 82 extend from the center of each edge of the rectangular table top and extend to lie adjacent a side of octagonal section 66. It should be noted that each of the corner and side sections respectively has one bolt hole 62 and two bolt holes 60 therein.

The top plate sections are spaced from each other to form channels 84 therebetween, and each is fully bonded over its entire bottom area to the top of honeycomb layer 18. Positioned in and extending from alternate ones of selected channels 84 and through all honeycomb layers of flexure member 16 are bores 86 (see also FIG. 2a) which terminate at smaller holes 88 in bottom plate 12. Bores 86 are so positioned that they are adjacent the edges of at least two segments, e.g., adjacent segments 74 and 80, shown in both FIGS. 2 and 2a. If desired, a bore, such as bore 86, may be positioned at the channel intersection among three sections. Surface swivel 38 from a vibrator 34 or 36 is secured to bottom plate 12 by a bolt 90 whose shaft extends through hole 88 and into threaded engagement with the surface swivel, but whose head 92 abuts against the interior of the bottom plate.

Placement of bores 86 within alternate channels 84 is desired, to ensure that the vibrations from vibrators 34 and 36 will be transmitted evenly throughout the table at points which will excite maximum mechanical displacements. An overall bonding material, such as is employed to bond honeycomb layer 24 to table base 12, is also employed in bonding the table top in place. The spaces between the table top sections are filled with a resilient material, such as a silicone rubber, to provide further damping.

Each of the sections of the table top provide different resonances in two rectangular directions. The resonant frequencies are generally higher than the fundamental frequencies of excitement of table base 12. Thus, each of the table top sections contributes a damped resonance, with the table top sections configured so that the resonant energy overlaps to provide a highly damped shaker table which is without high amplitude spikes over the entire operative range. A table of the general dimensions described herein can provide satisfactory performance over a frequency range, for example, of 40 Hertz to 2,000 Hertz.

This invention has been described in its presently contemplated best mode, and it is clear that it is susceptible to numerous modifications, modes and embodiments within the ability of those skilled in the art and without the exercise inventive faculty. Accordingly, the scope of this invention is defined by the scope of the following claims.

What is claimed is:

1. A shaker table for screening a device including a top segmented plate comprising a plurality of segments for receiving the device, a bottom plate, a flexure member coupled to and between said plates and to each of said segments, and means coupled to said bottom plate for imparting vibrations thereto and therefrom through said flexure member to each of said segments and therefrom to the device.

2. A shaker table for screening a device comprising:
a top segmented plate for receiving the device;
a bottom plate;
a flexure member coupled to and between said plates, and including a pair of honeycomb structures formed from undulating walls which extend between said plates in a first planar direction and which impart varying stiffness and yieldable characteristics to said structures along respective second and third planar directions that are perpendicular to each other and to the first direction, the first planar direction of said respective structure walls lying perpendicular to one another; and
means coupled to said bottom plate for imparting vibrations thereto and therefrom through said flexure member to the device.

3. A shaker table according to claim 2 in which said vibration means produces accelerations defined by vectors extending orthogonally with respect to one another, and further including:
means coupling said vibration means to said bottom plate for adjusting the magnitudes of the vectors, and
elestomeric adhesive selectively adhering said honeycomb structures together for amplifying the vectors lying in the second and third planar directions with respect to the vector lying in the first planar direction.

4. A shaker table according to claim 1 in which said segments are separated from one another by means defining channels.

5. A shaker table for screening a device comprising:
a top plate comprising a plurality of segments separated from one another by means defining channels for receiving the device;
a bottom plate;
a flexure member coupled to and between said plates;
means coupled to said bottom plate for imparting vibrations thereto and therefrom through said flexure member to the device; and
means defining an alignment of said vibration imparting means with said channel means to couple the vibrations to those of said segments which are adjacent to said channel means.

6. A shaker table according to claim 5 wherein said flexure member comprises a pair of honeycomb structures formed from undulating walls which extend between said plates in a first planar direction and which impart varying stiffness and yieldable characteristics to said structures along respective second and third planar directions that are perpendicular to each other and to the first direction, and wherein the first planar directions of said respective structure walls are mutually perpendicular.

7. A shaker table according to claim 6 in which said vibration means produces accelerations defined by vectors extending orthogonally with respect to one another, and further including:
means coupling said vibration means to said bottom plate for adjusting the magnitudes of the vectors, and
elastomeric adhesive selectively adhering said honeycomb structures together for amplifying the vectors lying in the second and third planar directions with respect to the vector lying in the first planar direction.

8. A shaker table according to claim 6 in which bores extend from said channel means through said honeycomb structures to said vibration imparting means.

9. A shaker table according to claim 8 further including elastomeric material placed in said channel means and the bores for damping the vibrations.

10. A shaker table comprising:
a table base;
vibrating means secured to said table base for imparting vibrations thereto;
mounting means for said table base for mounting said table base on a foundation and substantially for isolating vibration of said table base from the foundation;
a plurality of damping layers stacked on said table base for damping vibrations of said table base; and
a table top mounted on said damping layers for carrying and vibrating a device to be screened.

11. The shaker table of claim 10 wherein said plurality of damping layers comprises a plurality of layers of honeycomb sandwiches secured together, with the first of said plurality being secured to said table base and the last of said plurality being secured to said table top.

12. The shaker table of claim 11 wherein said layers have greater stiffness in one direction than in directions angled to the one direction, and wherein at least several of said layers of honeycomb sandwich have their directions mutually oriented in different directions.

13. The shaker table of claim 12 wherein said layers of honeycomb sandwich are secured together by means of a plurality of beads of rubbery adhesive.

14. The shaker table of claim 13 wherein the beads of rubbery adhesive extend in different directions between different honeycomb sandwich layers.

15. The shaker table of claim 10 wherein said table top comprises a plurality of segments separated by channels and said vibration means comprises vibrators secured to said table base in line with alternate ones of said channels to ensure transmission of vibrations from each of said vibrators at table locations of minimum dynamic stiffness and, therefore, maximum displacements.

16. The shaker table of claim 10 wherein said table top is segmented into a plurality of sections and each of said sections is separately resiliently adhesively secured to said stack of honeycomb sandwich layers.

17. The shaker table of claim 16 wherein one of said table top sections is a center section which is positioned substantially in the center of said table top and wherein the remainder of said table top sections respectively extend from an edge of said shaker table top to an edge adjacent to said center section.

18. The shaker table of claim 17 wherein said table top is rectangular and said center section is octagonal, and said remainder of said table top sections extend both from each corner of said reztangular table top to a position adjacent said center section and from each edge, intermediate the corners to adjacent sides of said octagonal center section.

19. The shaker table of claim 18 wherein there is at least one threaded hole in each said table top section for enabling the device to be screened to be secured thereto.

20. The shaker table of claim 18 wherein said plurality of damping layers comprises a plurality of layers of honeycomb sandwiches secured together, with the first of said plurality being secured to said table base and the last of said plurality being secured to said table top.

21. The shaker table of claim 20 wherein said layers have greater stiffness in one direction than in directions angled to the one direction, and wherein at least several of said layers of honeycomb sandwich have their directions mutually oriented in different directions.

22. The shaker table of claim 21 wherein said layers of honeycomb sandwich are secured together by means of a plurality of beads of elastomeric adhesive.

23. The shaker table of claim 22 wherein there is at least one threaded hole in each said table top section so that the device to be screened can be secured thereto.

24. A shaker table comprising:
a table base;
means for mounting said table base with respect to a foundation for substantially isolating vibration of said table base from the foundation;
at least one vibrator assembly secured to said table base for vibrating said table base at a selected frequency in three vector directions which are perpendicular to each other, with said first and second vectors lying in the plane of said table base and said third vector extending perpendicular thereto;
a first honeycomb sandwich having a honeycomb core and upper and lower sheets, said lower sheet being secured to said table base;
a second honeycomb sandwich having a honeycomb core and upper and lower sheets, said lower sheet of said second honeycomb sandwich being secured to said upper sheet of said first honeycomb sandwich by means of a plurality of spaced beads of resilient elastomeric adhesive so that said sheets are spaced from each other; and
a table top attached to said upper sheet of said second honeycomb sandwich so that said honeycomb sandwiches and said adhesive beads therebetween damp vibration of said table top as compared to vibration of said table base.

25. The shaker table of claim 24 wherein there are also third and fourth honeycomb sandwiches, each having a honeycomb core and upper and lower sheets, said third honeycomb sandwich lying on top of and spaced from said second honeycomb sandwich and said fourth honeycomb sandwich lying on top of and spaced from said third honeycomb sandwich, beads of elastomeric adhesive between said second and third honeycomb sandwiches and beads of adhesive between said third and fourth honeycomb sandwiches both to space said facing sheets of said sandwiches apart and to secure them to each other, said table top being secured directly to said fourth honeycomb sandwich.

26. The shaker table of claim 25 wherein said beads of said elastomeric adhesive between said honeycomb sandwiches extend in substantially straight, spaced lines and said lines between said first and second honeycomb sandwiches extend in a different direction than the lines of adhesive between said second and third honeycomb sandwiches.

27. The shaker table of claim 26 wherein said honeycomb cores are made of foil extending in a manufactured direction and said first and second honeycomb sandwich layers are positioned so that the respective manufactured directions extend at an angle with respect to each other.

28. The shaker table of claim 24 wherein said honeycomb cores are made of foil extending in a manufactured direction, and said first and second honeycomb sandwich layers are positioned so that the respective manufactured directions extend at an angle with respect to each other.

29. The shaker table of claim 24 wherein said table top is formed of a plurality of table top sections, with each of said table top sections spaced from each other, and each of said table top sections secured with a resilient material so that said table top sections can independently vibrate.

* * * * *